(12) United States Patent
Wehage et al.

(10) Patent No.: US 8,894,025 B2
(45) Date of Patent: Nov. 25, 2014

(54) MULTI-POSITION ADJUSTABLE HEIGHT SEAT POST

(75) Inventors: Kristopher Wehage, Mukilteo, WA (US); Jason Miles, Mukilteo, WA (US)

(73) Assignee: Tien Hsin Industries Co., Ltd., Taichung County (TW)

( * ) Notice: Subject to any disclaimer, the term of this patent is extended or adjusted under 35 U.S.C. 154(b) by 233 days.

(21) Appl. No.: 13/598,937

(22) Filed: Aug. 30, 2012

(65) Prior Publication Data

US 2014/0061419 A1 Mar. 6, 2014

(51) Int. Cl.
*F16B 7/10* (2006.01)

(52) U.S. Cl.
USPC .................... 248/157; 297/215.13; 403/109.1

(58) Field of Classification Search
USPC ......... 248/157, 161, 410, 411, 412, 413, 414; 297/215.13, 215.14; 403/109.1, 109.2, 403/109.3
See application file for complete search history.

(56) References Cited

U.S. PATENT DOCUMENTS

| | | | | |
|---|---|---|---|---|
| 5,593,239 | A * | 1/1997 | Sallee | 403/109.3 |
| 8,079,772 | B1 | 12/2011 | Brennan et al. | |
| 8,092,121 | B2 * | 1/2012 | Spearing et al. | 405/288 |
| 8,328,454 | B2 * | 12/2012 | McAndrews et al. | 403/109.7 |
| 8,678,939 | B2 * | 3/2014 | Fevre et al. | 464/167 |
| 2006/0039747 | A1 * | 2/2006 | Shoda et al. | 403/109.1 |
| 2006/0202098 | A1 * | 9/2006 | Hsieh | 248/410 |
| 2011/0097139 | A1 * | 4/2011 | Hsu | 403/109.1 |

* cited by examiner

*Primary Examiner* — Steven Marsh
(74) *Attorney, Agent, or Firm* — Alan D. Kamrath; Kamrath IP Lawfirm, P.A.

(57) ABSTRACT

A multi-position adjustable height seat post comprises an inner tube, an outer tube, a locking assembly, a triggering device, a first extending element, and a second extending element disposed between the tubes. The locking assembly comprises an actuating unit, a plurality of parallel grooves located in the outer tube, a plurality of spherical detent elements located, in the grooves, and a plurality of spherical elements located in the inner tube. The triggering device connects to the actuating unit. The first extending element constantly pushes the to actuating unit moving in a first direction. The second extending element disposes between the tubes. Once the triggering device is triggered, the actuating unit moves in a second direction contrary to the first direction and makes the spherical elements to move inward laterally to let the inner tube and outer tube move relative to each other freely.

20 Claims, 15 Drawing Sheets

Fig. 15

MULTI-POSITION ADJUSTABLE HEIGHT SEAT POST

BACKGROUND OF THE INVENTION

1. Field of the Invention

The invention relates to a multi-position adjustable height seat post, specifically a tube within another tube that allows for the adjustment of seat height to multiple positions while riding a bicycle.

2. Description of Related Art

Cyclists, specifically those involved in mountain hiking, find that it is beneficial to have a variety of seat height options while riding a bicycle. Seat height options are desired because they afford the rider greater control of the bicycle over widely varying terrain.

U.S. Pat. No. 8,079,772 patent had disclosed a multi-position bicycle seat post locking assembly. This invention provides for a multi-position adjustable height bicycle seat post locking assembly comprising an inner tube slidably supported within an outer tube. The outer tube has a smaller diameter so as to be received in the seat tube of a bicycle. The inner tube is adjustable, moving freely within the outer tube when not in a locked position. The direction of movement is based upon rider input. Either downward via rider weight or upward via spring force. The outer tube accommodates a locking assembly consisting of ball bearings, a lock ring, a compression lever, a spring, and an upper and lower retaining unit. The locking mechanism works by forcing ball bearings via the lock ring into corresponding spherical detent elements on the inner tube through holes in the outer tube. The inner tube can have multiple positions of height adjustability depending on the number of spherical detent elements provided in the inner tube. The lock, ring is cut with a steep angle at its top portion transitioning to a shallower angle below the steep angle. In the locked, position the lock ring is forced upwards onto its shallow angle via spring force which holds the ball bearings in the corresponding spherical detent elements within the inner tube. This shallow angle along with constant spring force on the lock ring allows the locking mechanism to self adjust to along the shallow angle of the lock ring as the seat post wears into its working position. Unlocking the mechanism consists of forcing the lock ring off its shallow angle position, past its steep angled position, and onto an upper zero angled position. This allows the ball hearings clearance to exit the spherical detent elements of the inner tube so that the inner tube moves freely within the outer tube.

Secondarily, the ball bearings are used to keep the inner post from twisting side to side as it travels longitudinally from position to position. This is done by forcing the ball bearings to track within channels of the inner tube. The channels run vertically from pocket to pocket along the inner tube. The inner tube is under constant force from a spring contained within the outer tube acting to extend the inner tube to its most extended position.

But this kind of seat post has some drawbacks below: First, after using certain period of time, the appearance of the inner tube will be wearing in virtue of the wear happened between the inner tube and the ball bearings when riders are adjusting the height of the seat post. This will result in quick ageing of the product appearance. Second, the progress of manufacture is difficult in virtue of the process of components.

The present invention has arisen to mitigate and/or obviate the disadvantages of the conventional.

SUMMARY OF THE INVENTION

The purpose of the present invention is to provide a multi-position adjustable height bicycle seat post locking assembly that can overcome the aforesaid drawbacks.

According to the present invention, the above purpose is achieved by a multi-position adjustable height bicycle scat post locking assembly mounted on the frame of a bike and essentially comprising an inner tube, an outer tube, a locking assembly, a triggering device, a first extending element, and a second extending element disposed between the tubes. The inner tube is adjustable, moving freely within the outer tube when not in a locked position. The direction of movement is based upon rider input. Either downward via rider's weight or upward via air pressure. The locking assembly is for locking, unlocking and preventing rotation of the inner tube with respect to the outer tube. The locking assembly comprises an actuating unit, a plurality of parallel grooves located in the outer tube, a plurality of spherical detent elements located in the parallel grooves, and a plurality of spherical elements located in the inner tube between the actuating unit and the outer tube. Furthermore, the above purpose is also achieved by a multi-position adjustable height bicycle seat post locking assembly with basically the same features mentioned above, wherein the outer tube consists of two separate pieces, and the hardness of the inter piece is higher than 200 Vickers Pyramid Number.

When the multi-position adjustable height seat post is at the locked position, the spherical elements engage with the spherical detent elements respectively, and the inner tube cannot move relative to the outer tube. When the seat post is at the locked position and the triggering device is triggered, the seat post will enter into a free position. When the multi-position adjustable height seat post is at the free position after the actuation, the spherical elements move inward out of the spherical detent elements and can now slide in the grooves. This allows the inner tube to move respect to the outer tube in the longitudinal direction. If the rider weights the saddle, the inner tube will lower decreasing the volume of the inner space of the tubes and increasing the inside air pressure. When the triggering device is released, the actuating unit moves downward, and the spherical. elements will engage with the lower spherical detent elements once the inner tube has lowered to the corresponding height.

The multi-position adjustable height seat post has several obvious advantages below: First, the internal locking mechanism improves external appearance of the inner tube. It hides wear damage of the interface inside on the outer tube for a like new external appearance in comparison with the U.S. Pat. No. 8,079,772 patent. Second, the smooth circular inner tube provides a proper sealing surface for wiper seal preventing dirt, water, and other contaminants from entering inside mechanism. Third, it allows for weight reduction in virtue of the replacing of coil spring with air spring. Fourth, the wear resistance is better in virtue of the steel material of the inner sleeve of outer tube. Fifth, it's easier to fabricate in virtue of the outer tube consisting of two separate pieces. The manufacturer can machine the inner piece and the outer piece individually.

Further benefits and advantages of the present invention will become apparent after a careful reading of the detailed description with appropriate reference to the accompanying drawings.

DETAILED DESCRIPTION OF THE INVENTION

The present invention will be dearer from the following description when viewed together with the accompanying drawings, which show, for purpose of illustrations only, the preferred embodiment in accordance with the present invention.

Referring to FIGS. 1-4, the first embodiment of a multi-position adjustable height seat post in accordance with the present invention is usually mounted on the frame of a bike (not shown) and essentially to comprises an inner tube 1, an outer tube 2, a locking assembly 3, a triggering device 4, a first extending element 5, and a second extending element 6.

The inner tube 1 comprises an upper end 11 and a lower end 12. The outer tube 2, consisting of an inner sleeve 21 made of steel and an outer sleeve 22 made of aluminum, comprises an upper end 23 and a lower end 24. Preferably the hardness of the inner sleeve 21 is higher than 200 Vickers Pyramid Number. The outer tube 2 has a diameter greater than that of the inner tube 1, and the outer tube 2 is configured to allow at least a portion of the lower end 12 of the inner tube 1 to slide into the upper end 23 of the outer tube 2.

The outer tube 2 is configured at its lower end 24 to be received by a standard seat tube receptacle of a bicycle frame (not shown) in the same manner as a standard bicycle seat post. The upper end 23 of the outer tube 2 is configured to accept the lower end 12 of the inner tube 1. The upper end 11 of the inner tube 1 is assembled with a mounting mechanism 100 suitable to accept a bicycle seat (not shown) and the weight of a bicycle rider.

Referring to FIGS. 4-7, the locking assembly 3 is for locking, unlocking and preventing rotation of the inner tube 1 with respect to the outer tube 2. The locking assembly 3 comprises an actuating unit 31, a pressure tube 32, a plurality of straight parallel grooves 33 located in vertical alignment along a portion of the outer tube 2, a plurality of spherical detent elements 34 located in the straight parallel grooves 33 of the outer tube 2, and a plurality of spherical elements 35.

Figure 8:
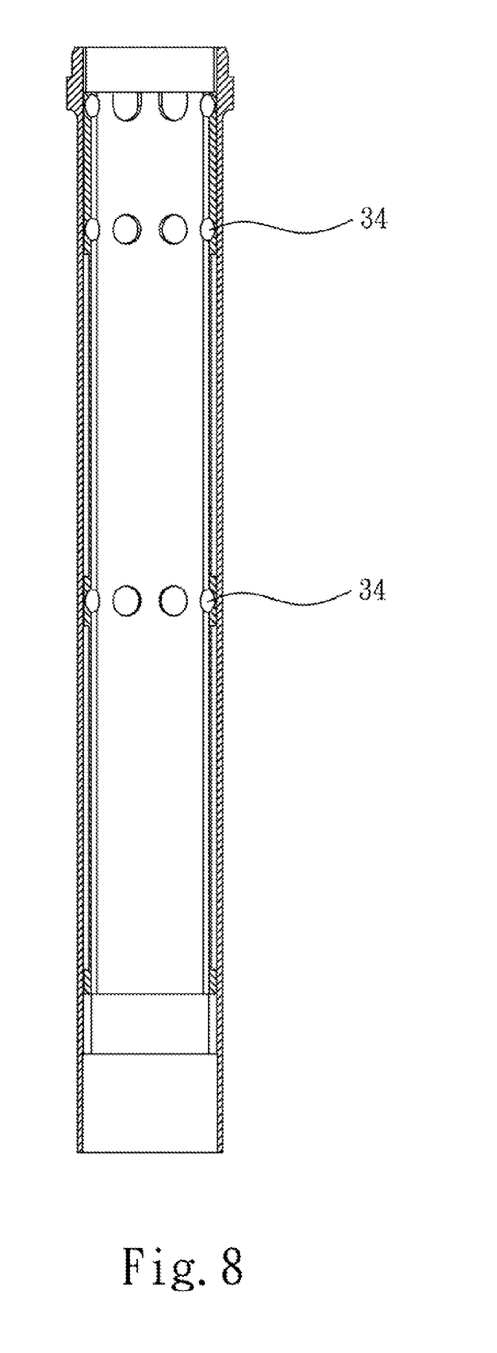
FIG. 8 shows a sectional view of an outer tube, wherein the detent elements are spherical.
Figure 9:
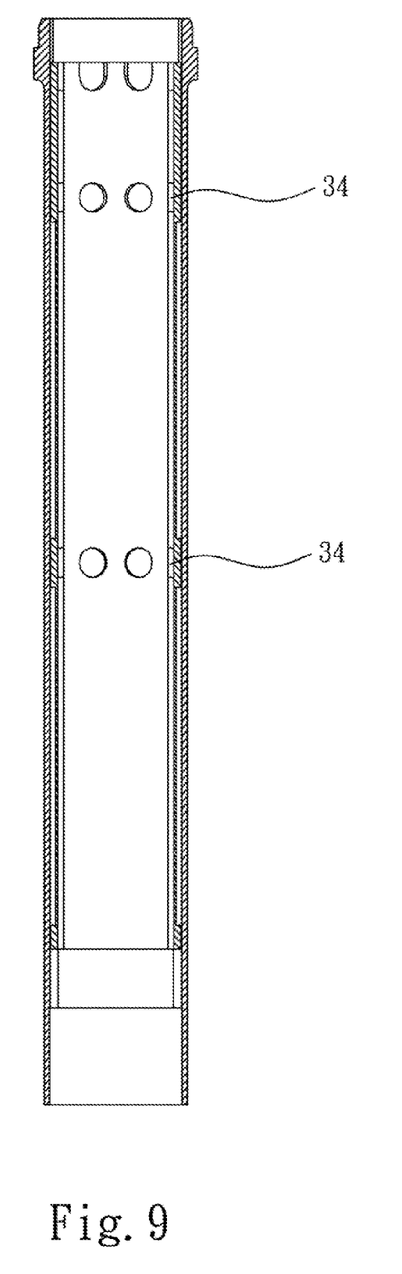
FIG. 9 shows a sectional view of a different kind of outer tube, wherein the detent elements are cylindrical.
Figure 10:
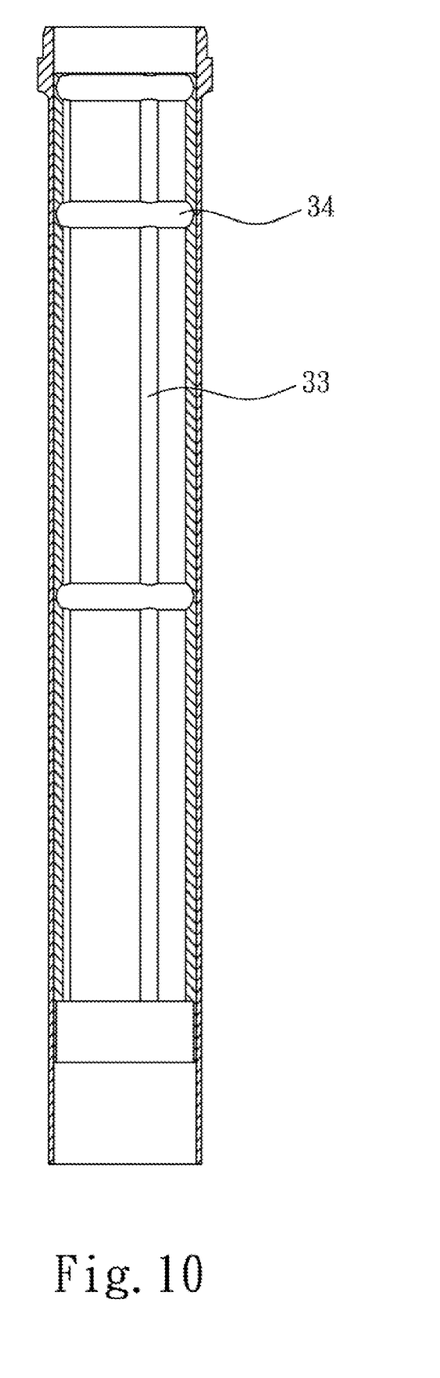
FIG. 10 shows a sectional view of a different kind of outer tube, wherein the detent elements are annular.

The actuating unit 31 is defined by an actuating element 311 and a locking element 312 configured on the actuating element 311. The parallel grooves 33 are spaced apart angularly by 45°, 90°, 135° and 90°. The shapes of the detent elements 34 are not limited to spherical. The spherical elements 35 located, in the inner tube 1 between the locking element 312 and the outer tube 2. Referring to FIGS. 8-10, the shapes of the detent elements 34 are spherical, cylindrical and annular respectively.

The triggering device 4 is a cable in this embodiment. The cable 4 passes through the pressure tube 32 to the upper end 11 of the inner tube 1 for actuation by rider.

The actuating element 311 contains a cylinder 3111 with the pressure tube 32 disposed inside, a cable head seat 3112, a first seal 3113 and a seal screw 3114. The head of the cable 4 is fixed on the cable head seat 3112. The seal screw 3114 is to fix the head of the cable 4 in the cable head seat 3112. The first seal 3113 is disposed between the bottom of the actuating element 311 and the seal screw 3114.

The pressure tube 32 contains a through hole 321 for the cable 4, a piston portion 322 thrilled on the lower end and disposed in the cylinder 3111 of the actuating element 311, and a second seal 323 configured between the piston portion 322 and the cylinder 3111.

The locking element 312 contains a first ramp section 3121, a second ramp section 3127 and an accommodated room 3123 which is formed below the second ramp section 3122. The first ramp section 3121 is steeper than the second ramp section 3122.

The first extending element 5 acts with constant spring force upon top of the locking element 312 to move the actuating element 311 and locking element 312 longitudinally downward inside the inner tube 1. The first extending element 5 is a compression spring in this embodiment. The downward direction defines a first direction.

The second extending element 6 includes a valve 61 and a compression room 62. The valve is configured to introduce air into the compression room 62 and disposed at the lower portion of the outer tube 2. The compression roam 62 is defined by the area inside the inner tube 1 and outer tube 2, extending from the valve 61 at the lower portion of the outer tube 2 to the upper portion of the inner tube 1. The position of the valve 61 is not limited to this embodiment. The second seal 323 of the pressure tube 32 isolates the compression room 62 from the atmosphere.

Figure 1:
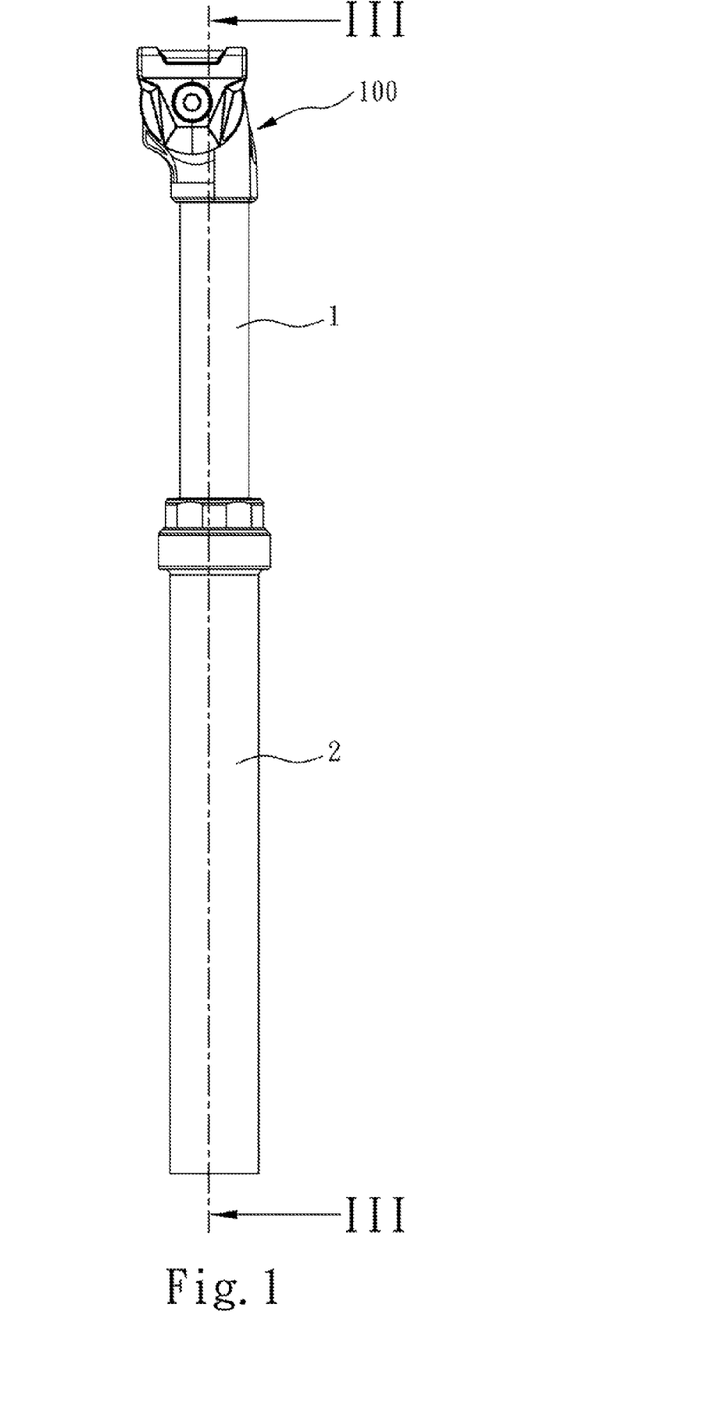
FIG. 1 shows a perspective view of the first embodiment of the present invention.
Figure 2:
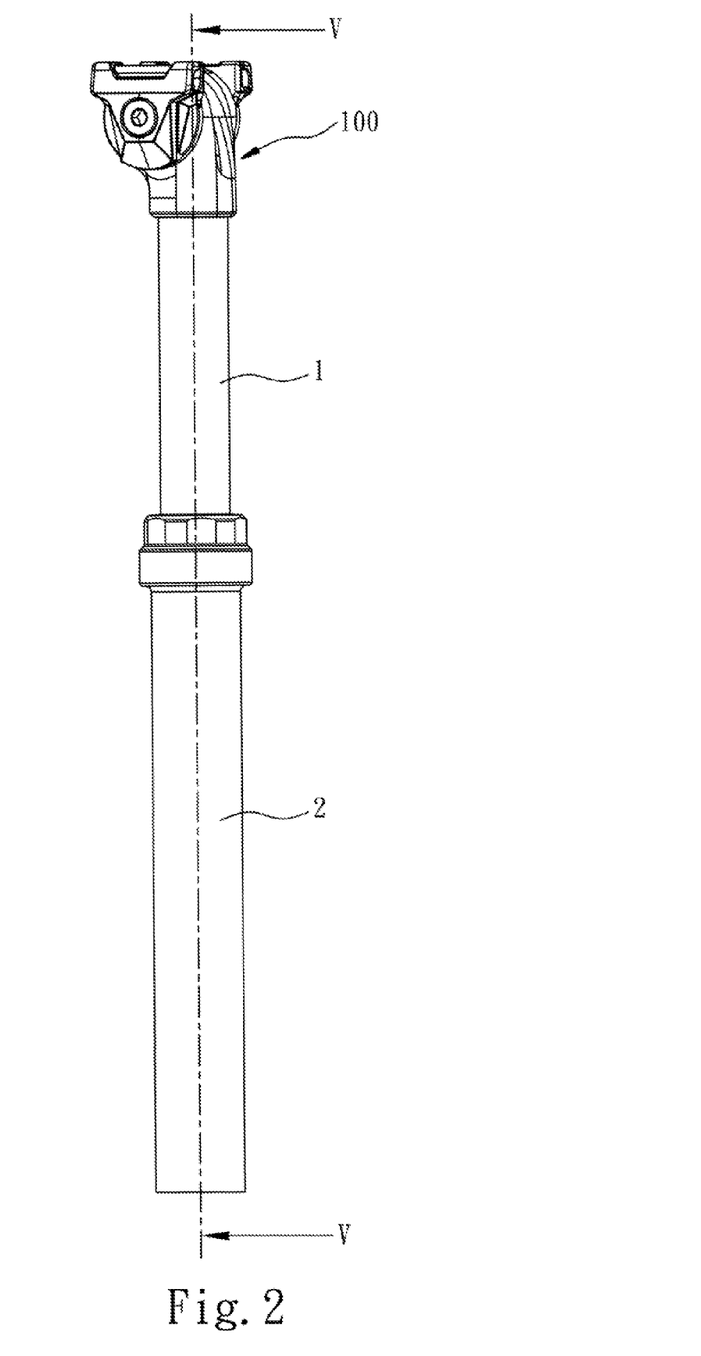
FIG. 2 shows a another perspective view of the first embodiment of the present invention.
Figure 3:
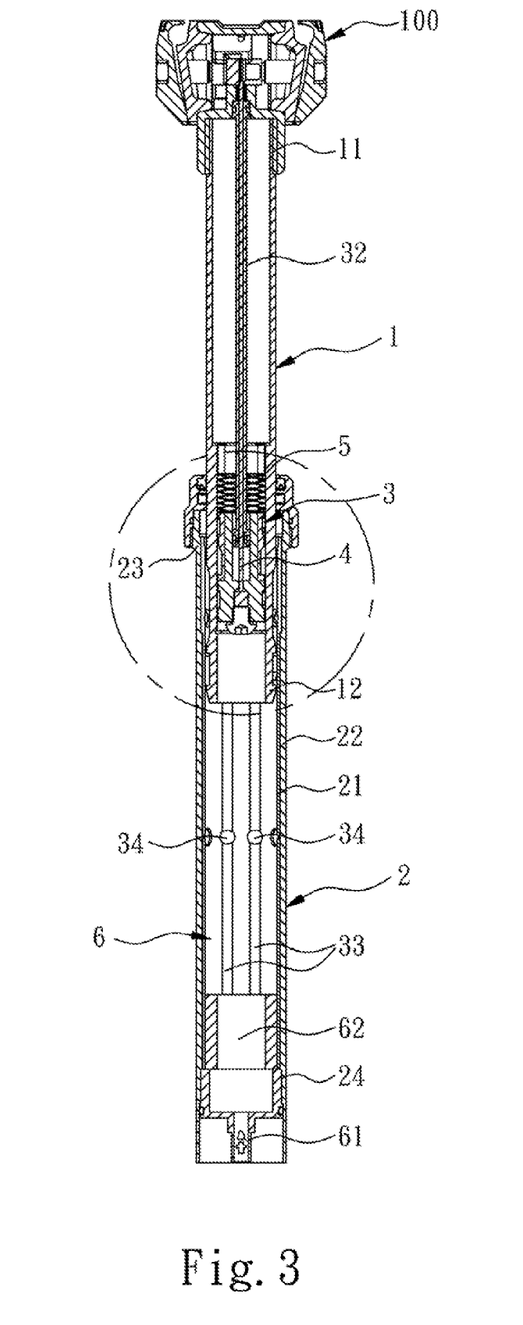
FIG. 3 shows a sectional view of the first embodiment of the present invention in FIG. 1.
Figure 4:
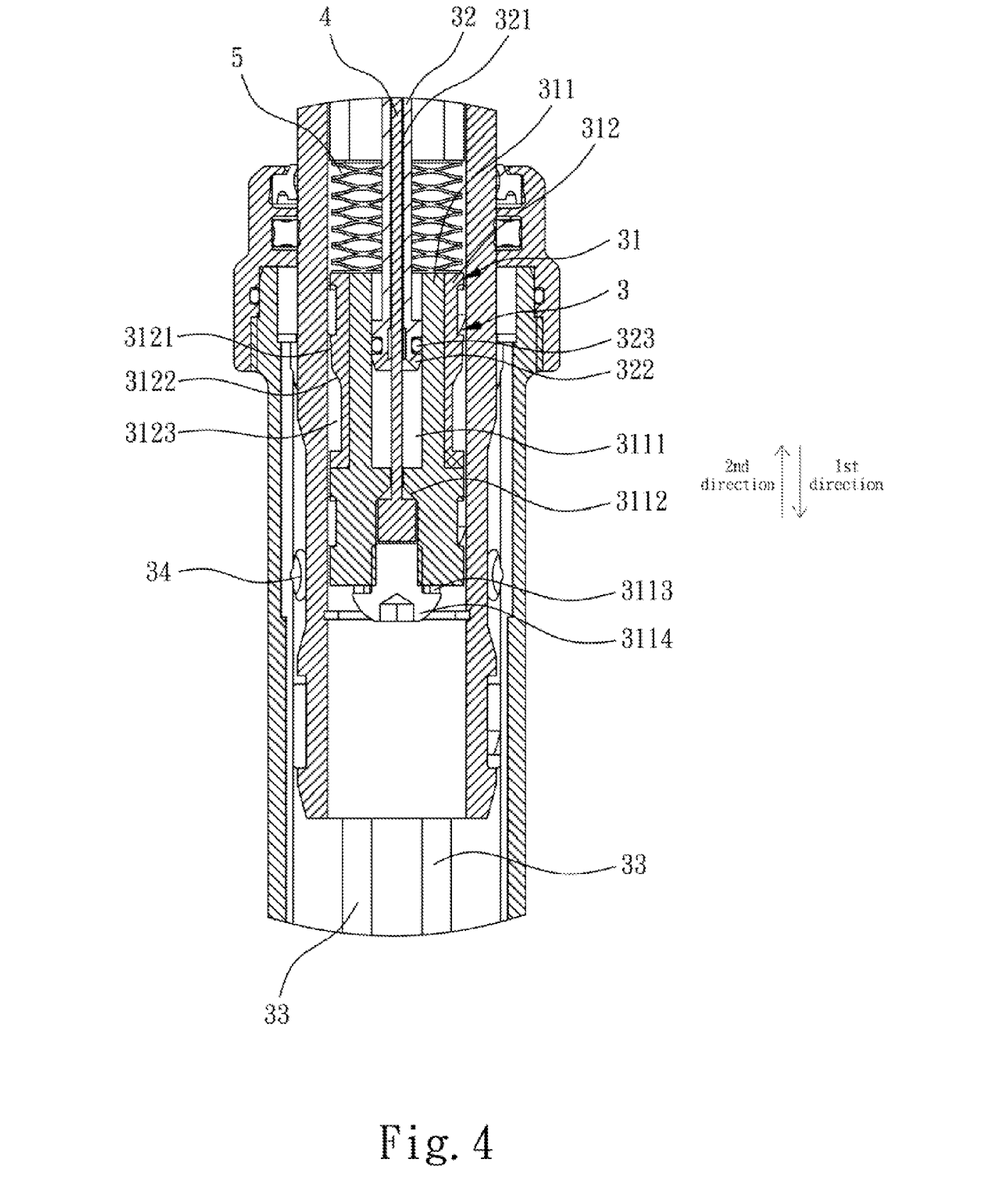
FIG. 4 shows a closer sectional view of FIG 3.
Figure 5:
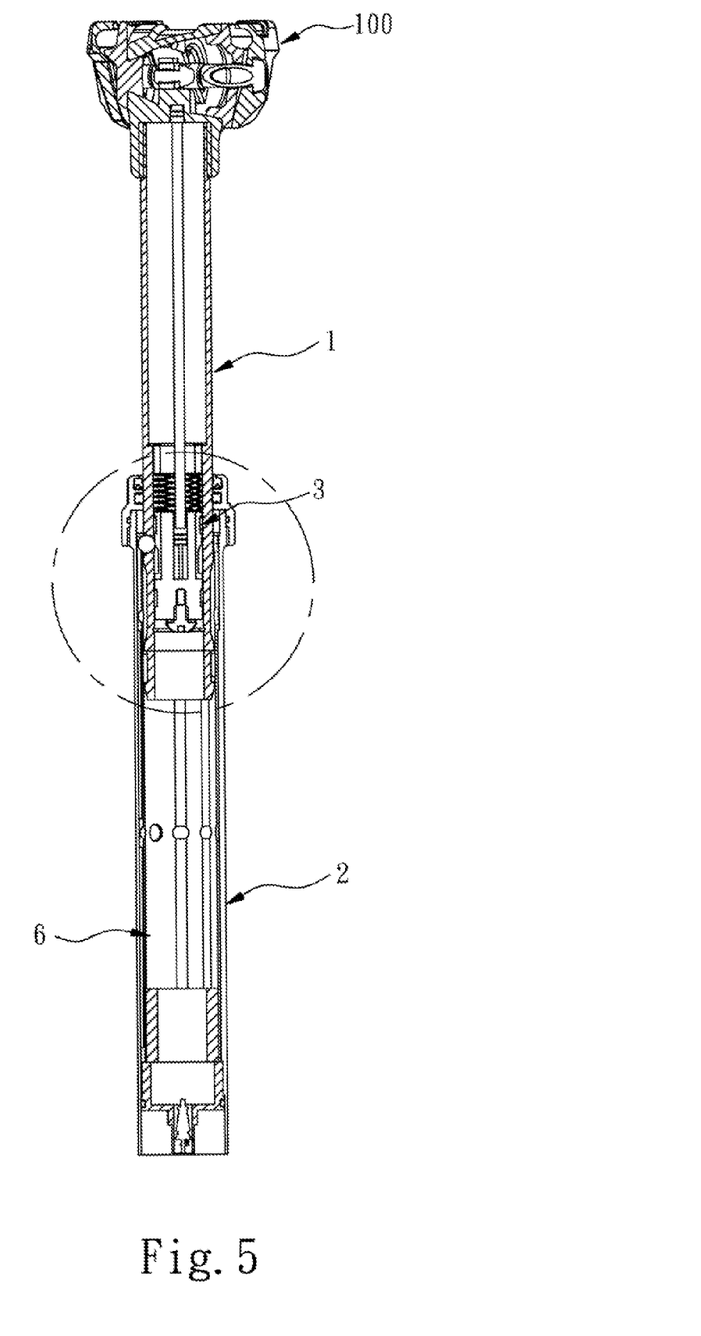
FIG. 5 shows a sectional view of FIG. 2 in a different direction.

Referring to FIG. 5, the multi-position adjustable height seat post is at a locked position. The spherical elements 35 engage with the spherical detent elements 34 respectively, and the inner tube 1 cannot move with respect to the outer tube 2. When the seat post is at the locked position and the triggering device 4 is triggered, referring to FIG. 11-13, the triggering device 4 moves upward, pulling up the actuating unit 31, disengaging the locking element 312 and the spherical elements 35, allowing the spherical elements 35 to disengage with the spherical detent elements 34 and slide from the first ramp section 3121 through the second ramp section 3122 into the accommodated room 3123. The upward direction defines a second direction.

Figure 11:
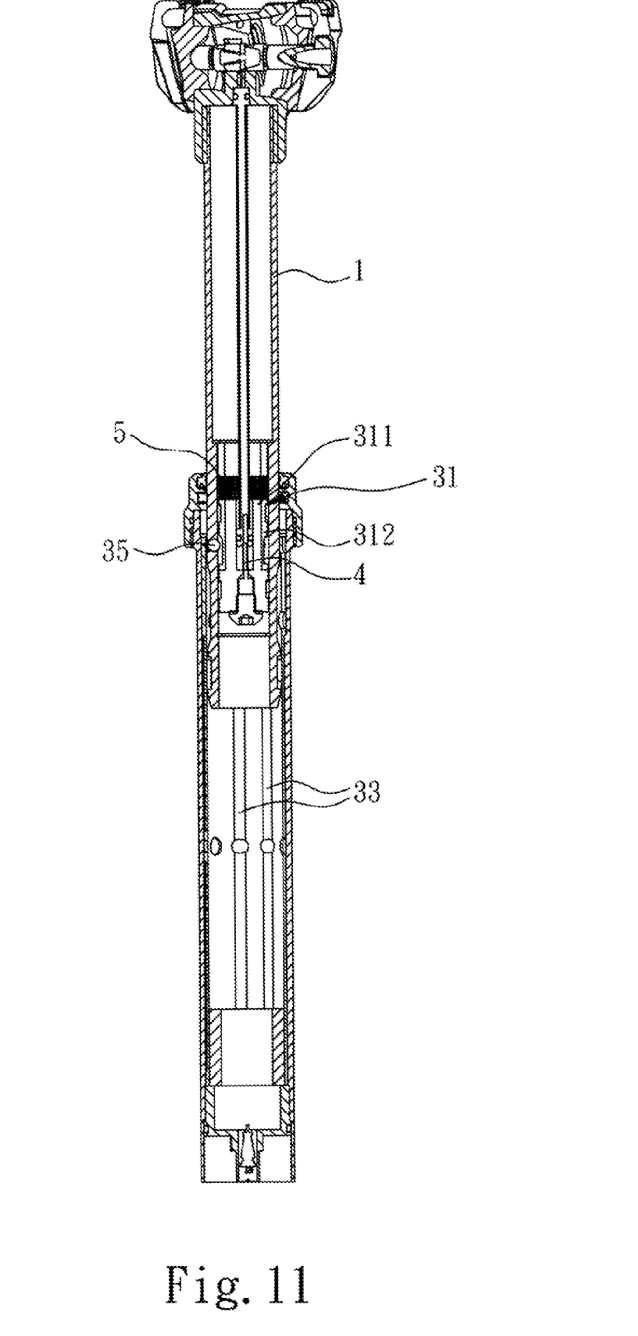
FIG. 11 shows another sectional view of FIG. 2, wherein a triggering device is triggered, and the triggering device is a cable.
Figure 12:
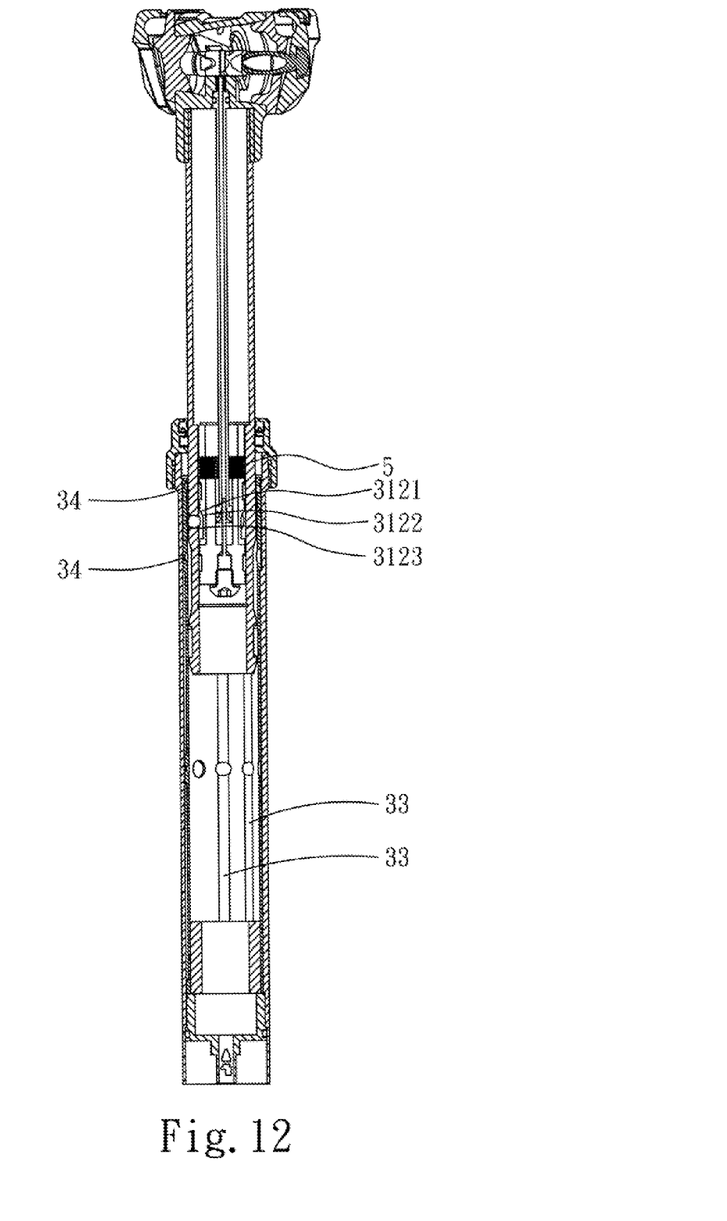
FIG. 12 shows another state of FIG. 11, wherein the spherical elements are between the upper detent elements and the middle detent elements.
Figure 13:
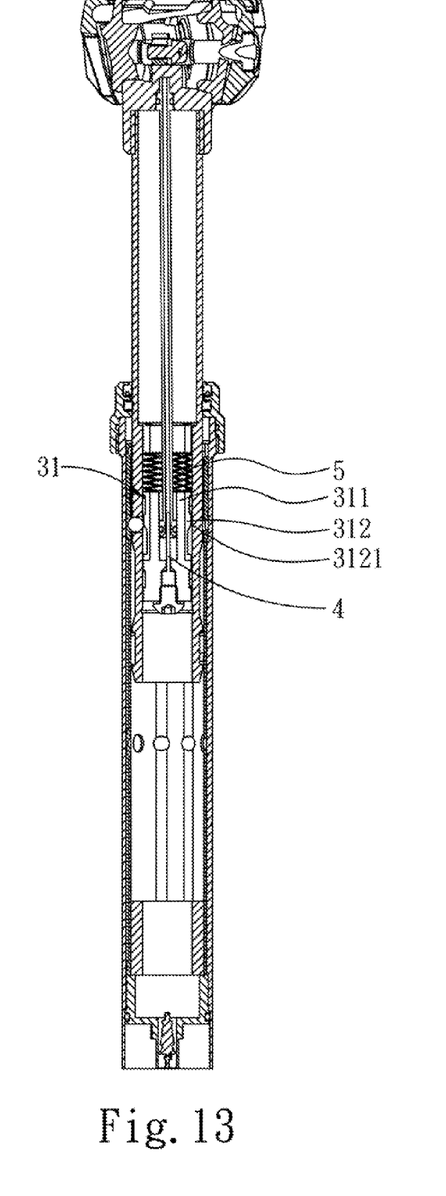
FIG. 13 further shows another state of FIG. 11, wherein the spherical elements engage with the middle detent elements.

The multi-position adjustable height seat post is at a free position after the actuation because the spherical elements 35 have moved inward out of the spherical detent elements 34 and can now slide in the grooves 33. This allows the inner tube 1 to move with respect to the outer tube 2 in the longitudinal direction. If the rider weights the saddle (not shown), the inner tube 1 will lower decreasing the volume of the compression room 62 and increasing the inside air pressure.

When the triggering device 4 is released, referring to FIG. 13, the triggering device 4 moves downward and the first extending element 5 will force the actuating unit 31 to move downward, pushing the spherical elements 35 outward by means of the first ramp section 3121. This allows the spherical elements 35 to engage with the lower spherical detent elements 34 when the inner tube 1 has lowered to corresponding height.

The current preferable number of spherical elements 35 is four. However, any number of spherical elements 35 could be used. The spherical elements 35 protrude outward through four holes 13 in the inner tube 1 contacting the outer tube 2 in either a plurality of spherical detent elements 34 or a plurality of grooves 33.

The currently preferred number of spherical detent elements 34 is 12. However, there are various possibilities with regards to the number of spherical detent elements 34 within the outer tube 2.

The currently preferred numbers of sets of spherical detent element 34, which positions along the vertical axis of the outer tube 2, are three. However, there are various possibilities with regards to the number of spherical detent element 34 within the outer tube 2.

The currently preferred positions of spherical detent elements 34 are at zero, one and four inches along the vertical axis of the outer tube 2. However, there are various possibilities with regards to the position of spherical detent elements 34 within the outer tube 2.

The currently preferable numbers of parallel grooves 33 within the outer tube 2 are four. However, there are various possibilities with regards to the number of parallel grooves 33 within the outer tube 2.

The spherical elements 35 are used both as guides, tracking along parallel grooves 33 within the outer tube 2, and function for locking when forced into spherical detent elements 34 on the outer tube 2. As guides, the spherical elements 35 track from detent element 34 to detent element 34 along the parallel grooves 33 of the outer tube 2 respectively, preventing rotational movement of the outer tube 2 with respect to the inner tube 1.

Figure 6:
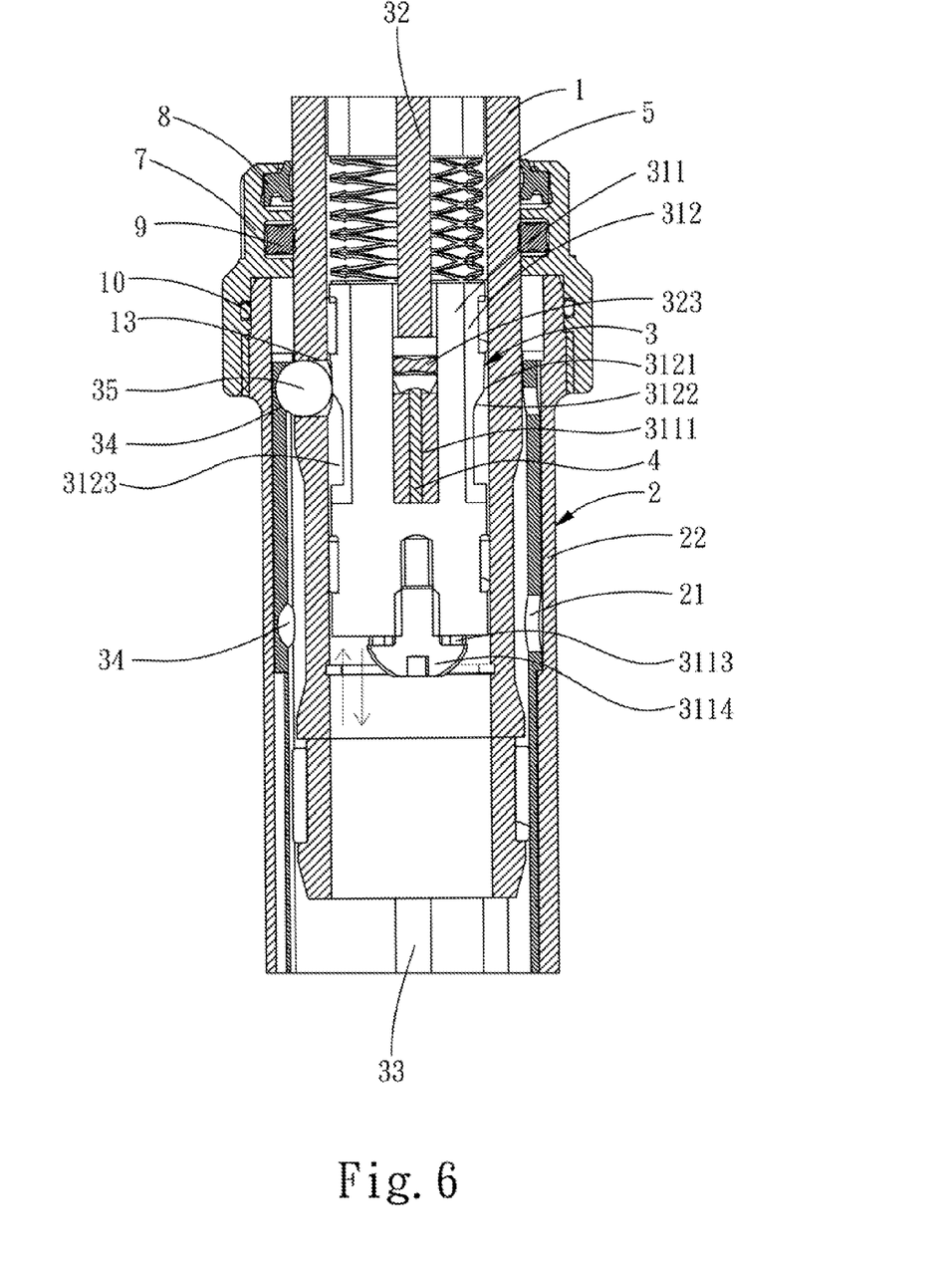
FIG. 6 shows a closer sectional view of FIG. 5.
Figure 7:
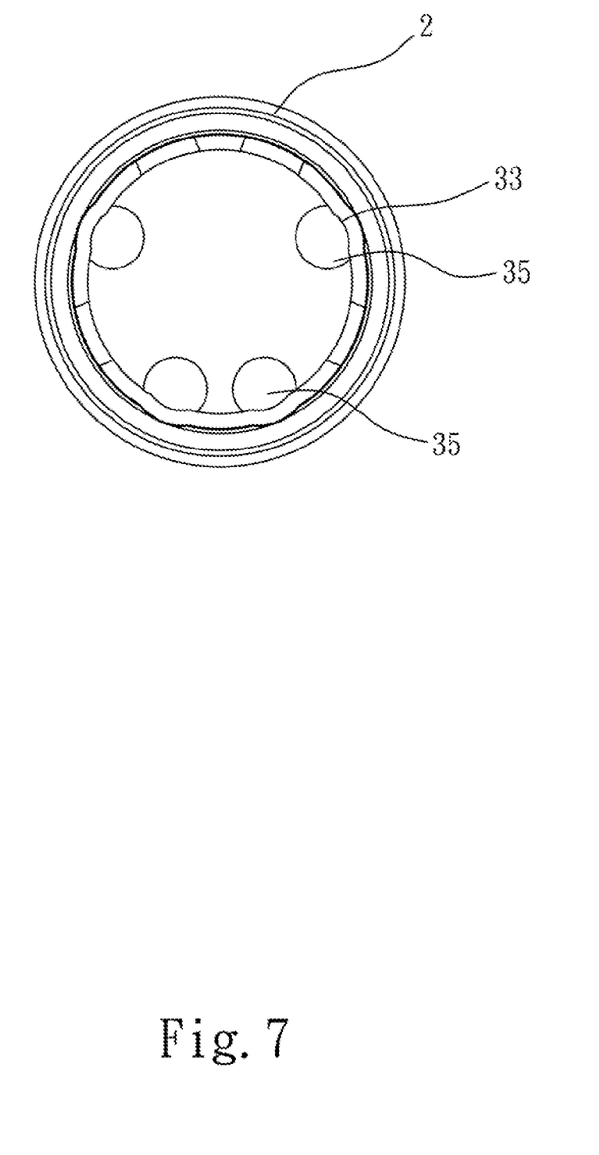
FIG. 7 shows a top view of the outer tube and spherical elements of the first embodiment.

Referring to FIG. 6, the multi-position adjustable height seat post further comprises a collar 7, a third seal 8, a fourth seal 9 and a fifth seal 10. The collar 7 is assembled on the top of the outer tube 2. The third seal 8 is disposed between collar 7 and the inner tube 1. The fourth seal 9 is disposed below the third seal 8 and between collar 7 and the inner tube 1. The fifth seal 10 is disposed between the collar 7 and the outer tube 2.

Figure 14:
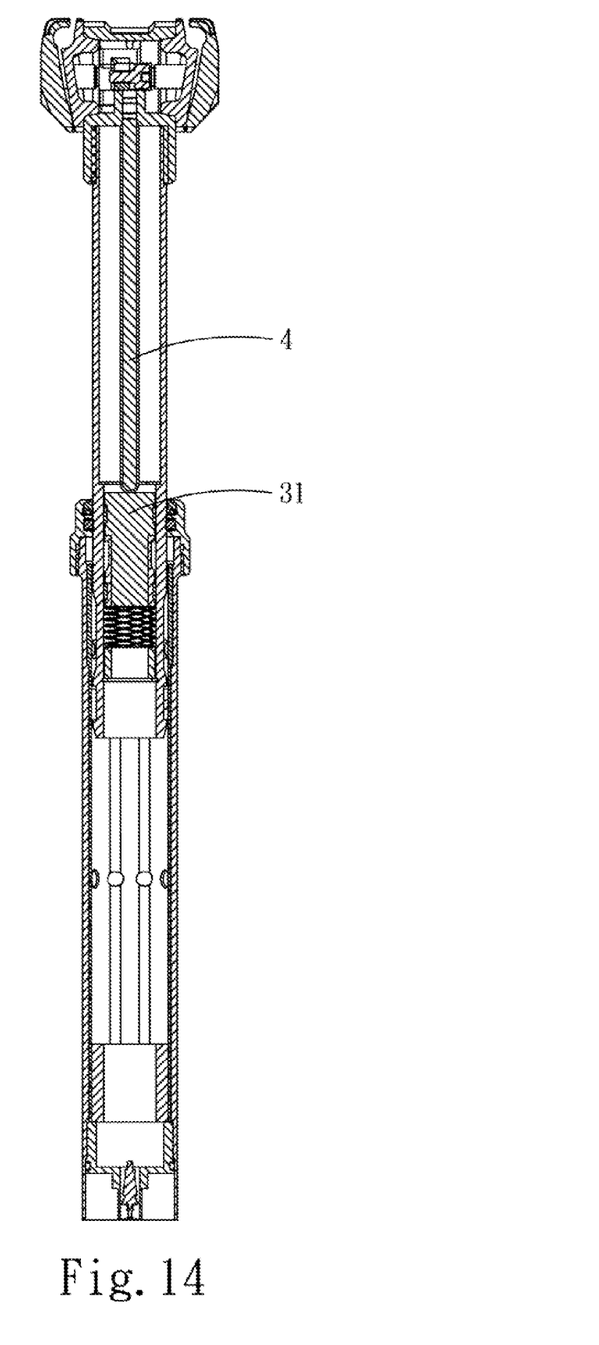
FIG. 14 shows a sectional view of a second embodiment, wherein the triggering device is a push rod.

Referring to FIG. 14, the second embodiment of a multi-position adjustable height seat post comprises a triggering device 4 which is a push rod connected to the actuating unit 31.

Figure 15:
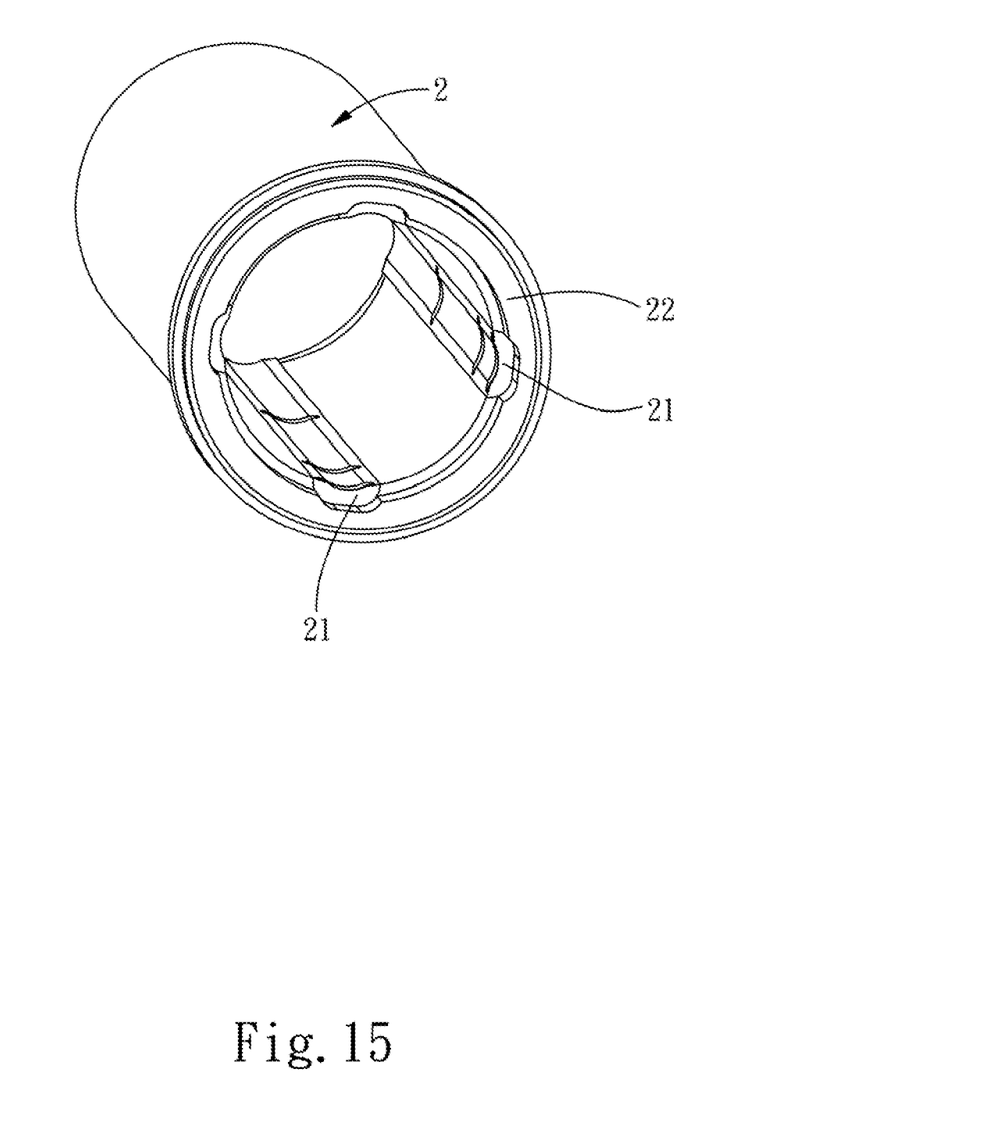
FIG. 15 shows a perspective view of the outer tube of a third embodiment, wherein the outer tube consists of lour inner pieces and an outer sleeve.

Referring to FIG. 15, the third embodiment of a multi-position adjustable height seat post comprises an outer tube 2, consisting of an outer sleeve 22 and four inner pieces 21 made of steel.

To sum up the above statements, the multi-position adjustable height seat post has several obvious advantages below:

First, the internal locking mechanism improves external appearance of the inner tube 1. It hides wear damage of the interface inside on the outer tube 2 for a like new external appearance in comparison with the U.S. Pat. No. 8,079,772 patent.

Second, the smooth circular inner tube 1 provides a proper to sealing surface for wiper seal preventing dirt, water, and other contaminants from entering inside mechanism.

Third, it allows for weight reduction in virtue of the replacing of coil spring with air spring (second extending element 6).

Fourth, the wear resistance is better in virtue of the steel material of the inner sleeve 22 of outer tube 2.

Fifth, its easier to fabricate in virtue of the outer tube 2 consisting of two separate pieces. The manufacturer can machine the inner piece 21 and the outer piece 22 individually.

While we have shown and described various embodiments in accordance with the present invention, it is clear to those skilled in the art further embodiments may be made without departing from the scope of the present invention.

What is claimed is:

1. A multi-position adjustable height seat post comprising:
an inner tube,
an outer tube, movably connected to the inner tube,
a locking assembly, comprising an actuating unit, a plurality of parallel grooves located in the outer tube, a plurality of spherical detent elements located in the grooves, and a plurality of spherical elements located in the inner tube between the actuating unit and the outer tube,
a triggering device, connected to the actuating unit,
a first extending element, constantly applying a force to push the actuating unit moving in a first direction; and
a second extending element, acting between the inner and outer tubes,
wherein once the triggering device is triggered, the actuating unit moves in a second direction contrary to the first direction and makes the spherical elements move inward laterally to let the inner tube and outer tube move relative to each other freely.

2. The multi-position adjustable height seat post as claimed in claim 1, wherein the triggering device is a cable connected to the actuating unit.

3. The multi-position adjustable height seat post as claimed in claim 1, wherein the triggering device is a push rod connected to the actuating unit.

4. The multi-position adjustable height seat post as claimed in claim 1, wherein the actuating unit includes an actuating element and a locking element.

5. The multi-position adjustable height seat post as claimed in claim 4, wherein the locking element contains a first ramp section, a second ramp section and an accommodated room which is formed below the second ramp section, the first ramp section is steeper than the second ramp section, when the triggering device is triggered, the spherical elements move from the first ramp section through the second ramp section into the accommodated room.

6. The multi-position adjustable height seat post as claimed in claim 1, wherein the second extending element includes a valve and a compression room, the compression room is defined by the area inside the inner and outer tubes, the valve is configured to introduce air into the compression room.

7. The multi-position adjustable height seat post as claimed in claim 6, wherein the first extending element is a compression spring.

8. The multi-position adjustable height seat post as claimed in claim 1, wherein the outer tube consists of an inner sleeve and an outer sleeve, the hardness of the inner sleeve is higher than 200 Vickers Pyramid Number.

9. The multi-position adjustable height seat post as claimed in claim 6, wherein the outer tube is split into at least two pieces to allow for manufacture of spherical detent elements and to contain air in the compression room.

10. The multi-position adjustable height seat post as claimed in claim 1, wherein the parallel grooves are spaced apart angularly by 45°, 90°, 135° and 90°.

11. A multi-position adjustable height seat post comprising:
   an inner tube,
   an outer tube, movably connected to the inner tube, consists of at least one inner piece and one outer piece, the hardness of the inner piece is higher than 200 Vickers Pyramid Number.
   a locking assembly, comprising an actuating unit connected to the cable, a plurality of parallel grooves located in the outer tube, a plurality of detent elements located in the grooves, and a plurality of spherical elements located in the inner tube between the actuating unit and the outer tube,
   a triggering device, connected to the actuating unit,
   a first extending element, constantly applying a force to push the actuating unit moving in a first direction; and
   a second extending element, acting between the inner and outer tubes,
   wherein once the triggering device is triggered, the actuating unit moves in a second direction contrary to the first direction and makes the spherical elements to move inward laterally to let the inner tube and outer tube move relative to each other freely.

12. The multi-position adjustable height seat post as claimed in claim 11, wherein the triggering device is a cable connected to the actuating unit.

13. The multi-position adjustable height seat post as claimed in claim 11, wherein the triggering device is a push rod connected to the actuating unit.

14. The multi-position adjustable height seat post as claimed in claim 11, wherein the actuating unit includes an actuating element and a locking element.

15. The multi-position adjustable height seat post as claimed in claim 14, wherein the locking element contains a first ramp section, a second ramp section and an accommodated room which is formed below the second ramp section, the first ramp section is steeper than the second ramp section, when the triggering device is triggered, the spherical elements move from the first ramp section through the second ramp section into the accommodated room.

16. The multi-position adjustable height seat post as claimed in claim 11, wherein the second extending element includes a valve and a compression room, the compression room is defined by the area inside the inner and outer tubes, the valve is configured to introduce air into the compression room.

17. The multi-position adjustable height seat post as claimed in claim 16, wherein the first extending element is a compression spring.

18. The multi-position adjustable height seat post as claimed in claim 11, wherein the parallel grooves are spaced apart angularly by 45°, 90°, 135° and 90°.

19. The multi-position adjustable height seat post as claimed in claim 11, wherein the shapes of the detent elements are cylindrical.

20. The multi-position adjustable height seat post as claimed in claim 11, wherein the shapes of the detent elements are annular.

* * * * *